United States Patent
Balakrishnan

(10) Patent No.: US 7,353,251 B1
(45) Date of Patent: Apr. 1, 2008

(54) AUTOMATED CALL LAUNCHING

(75) Inventor: Pradeep Balakrishnan, Burlington, MA (US)

(73) Assignee: Polycom, Inc., Pleasanton, CA (US)

( * ) Notice: Subject to any disclaimer, the term of this patent is extended or adjusted under 35 U.S.C. 154(b) by 0 days.

(21) Appl. No.: 09/495,134

(22) Filed: Jan. 31, 2000

Related U.S. Application Data

(60) Provisional application No. 60/174,527, filed on Jan. 5, 2000, provisional application No. 60/171,876, filed on Dec. 23, 1999.

(51) Int. Cl.
G06F 15/16 (2006.01)

(52) U.S. Cl. .................................. 709/204; 709/208

(58) Field of Classification Search ............... 709/204, 709/208, 227, 200, 228
See application file for complete search history.

(56) References Cited

U.S. PATENT DOCUMENTS

| | | | | |
|---|---|---|---|---|
| 5,325,194 A | * | 6/1994 | Natori et al. | 348/14.09 |
| 5,471,318 A | * | 11/1995 | Ahuja et al. | 358/400 |
| 5,473,363 A | * | 12/1995 | Ng et al. | 348/14.09 |
| 5,491,743 A | * | 2/1996 | Shiio et al. | 709/204 |
| 5,555,017 A | * | 9/1996 | Landante et al. | 348/14.09 |
| 5,589,873 A | * | 12/1996 | Natori et al. | 348/14.09 |
| 5,627,978 A | * | 5/1997 | Altom et al. | 715/758 |
| 5,631,904 A | * | 5/1997 | Fitser et al. | 370/261 |
| 5,680,392 A | * | 10/1997 | Semaan | 370/261 |
| 5,737,010 A | * | 4/1998 | Yachi et al. | 348/14.09 |
| 5,764,750 A | * | 6/1998 | Chau et al. | 379/229 |
| 5,841,976 A | * | 11/1998 | Tai et al. | 709/204 |
| 5,867,494 A | * | 2/1999 | Krishnaswamy et al. | 370/352 |
| 5,943,321 A | * | 8/1999 | St-Hilaire et al. | 370/259 |
| 5,999,208 A | * | 12/1999 | McNerney et al. | 348/14.08 |
| 6,006,253 A | * | 12/1999 | Kumar et al. | 709/204 |
| 6,018,360 A | * | 1/2000 | Stewart et al. | 348/14.09 |
| 6,105,054 A | * | 8/2000 | Kawashima | 709/204 |
| 6,122,259 A | * | 9/2000 | Ishida | 370/260 |
| 6,167,432 A | * | 12/2000 | Jiang | 709/204 |
| 6,192,395 B1 | * | 2/2001 | Lerner et al. | 709/204 |
| 6,285,392 B1 | * | 9/2001 | Satoda et al. | 348/14.09 |
| 6,330,022 B1 | * | 12/2001 | Seligmann | 348/14.08 |
| 6,396,510 B1 | * | 5/2002 | Pendse et al. | 715/739 |
| 6,424,994 B1 | * | 7/2002 | Pirich et al. | 709/205 |

(Continued)

OTHER PUBLICATIONS

PicureTel 240 H.320-H.323 Gateway, 1999, (2 pgs.).

(Continued)

*Primary Examiner*—William Vaughn
*Assistant Examiner*—Kristie Shingles
(74) *Attorney, Agent, or Firm*—Wong, Cabello, Lutsch, Rutherford, & Brucculeri, LLP

(57) ABSTRACT

According to the principles of the invention, there is provided a system, apparatus, and method for automated call launching in a call conferencing network. The system includes computer executable code for sharing information among a plurality of multipoint conference units, so that a remote user may, from a web site for example, initiate a conference call from one of the multipoint conference units. Using distributed code, a user's call request initiates a search of the network for a multipoint conference unit with adequate capacity and suitable capabilities for a requested call. Once a multipoint conference unit is selected, the multipoint conference unit calls out to selected participants who may accept or decline the call. This call setup is transparent to the user, who receives an acknowledgment once the conference call has been initiated.

14 Claims, 4 Drawing Sheets

| | |
|---|---|
| MCU List Manager | 212 |
| Virtual Conference Room Manager | 214 |
| Virtual Conference Room Port Monitor | 216 |
| Conference Room Other Monitor | 218 |
| Automatic Call Launcher | 220 |
| Web Center Service Handler | 222 |
| MCU Administrator Module | 224 |
| Video Conferencing Clients Monitor | 226 |
| Data Sharing Enabler | 228 |
| Continuous Presence Enabler | 230 |
| Audio/Video Codec Selector | 232 |
| Remote MCU Control | 234 |
| Data & Error Logger | 236 |
| MCU Notification Manager | 238 |
| Hardware Abstraction | 200 |

U.S. PATENT DOCUMENTS

| | | | |
|---|---|---|---|
| 6,438,111 B1 * | 8/2002 | Catanzaro et al. | 370/260 |
| 6,614,781 B1 * | 9/2003 | Elliott et al. | 370/352 |
| 6,629,129 B1 * | 9/2003 | Bookspan et al. | 709/204 |
| 6,646,997 B1 * | 11/2003 | Baxley et al. | 370/260 |
| 6,657,975 B1 * | 12/2003 | Baxley et al. | 370/260 |
| 6,687,234 B1 * | 2/2004 | Shaffer et al. | 370/260 |
| 6,754,322 B1 * | 6/2004 | Bushnell | 379/202.01 |
| 6,885,662 B2 * | 4/2005 | Gerszberg et al. | 370/354 |
| 7,020,697 B1 * | 3/2006 | Goodman et al. | 709/223 |
| 7,133,928 B2 * | 11/2006 | McCanne | 709/238 |

OTHER PUBLICATIONS

PitureTel 330 http://www.pituretel.com/products/pt330p.htm, Dec. 7, 1994, (3 pgs.).

* cited by examiner

AUTOMATED CALL LAUNCHING

CROSS REFERENCE TO RELATED APPLICATIONS

This application claims the benefit of Provisional Patent Application Ser. No. 60/171,876 filed on Dec. 23, 1999, entitled "Automated Call Launching" and of Provisional Patent Application Ser. No. 60/174,527 filed on Jan. 5, 2000, entitled "Automated Call Launching".

BACKGROUND OF THE INVENTION

1. Field of the Invention

This application relates to the field of video conferencing, and more particularly to the field of automated call management in a distributed video conferencing environment.

2. Description of Related Art

Video conferencing systems are being used in a wide variety of settings to enable effective communication among participants (and audiences) at different geographical sites. Each video conferencing location includes a video camera, a display, a microphone, and a speaker. Each video conferencing location may also be equipped for data collaboration such as file sharing, a collaborative white board, and the like. In general, the content making up a video conference, including audio, video, and data, is directed through one or more multi-point conference units ("MCU's") that aggregate media streams from the various participants, and that mix and distribute appropriate streams to the participants and the audience. The system may employ one or more gateways to permit conferences that join participants across data networks and telecommunications networks.

Video conferencing terminals and MCU's do not advertise information concerning the identity or capabilities of video conferencing stations connected thereto. Thus, existing video conferencing systems require a network operating center ("NOC") at which a human operator sets up and launches calls. The operator at the network operating center performs administrative tasks such as locating an MCU with sufficient switching capacity to handle a conference call, ensuring compatibility between audio and video codecs, and ensuring that the location of each participant is known by either Internet Protocol ("IP") address for data networks, or by telephone number for telecommunications networks. These administrative functions are performed manually using information gathered from participants and MCU's.

There remains a need for automatic call management system for video conferencing that permits users to create and administer video conferencing calls without the centralized control of a network operating center.

SUMMARY OF THE INVENTION

According to the principles of the invention, there is provided a system, apparatus, and method for automated call launching in a call conferencing network. The system includes computer executable code for sharing information among a plurality of multipoint conference units, so that a remote user may, from a web site for example, initiate a conference call from one of the multipoint conference units. Using distributed code, a user's call request initiates a search of the network for a multipoint conference unit with adequate capacity and suitable capabilities for a requested call. Once a multipoint conference unit is selected, the multipoint conference unit calls out to selected participants who may accept or decline the call. This call setup is transparent to the user, who receives an acknowledgment once the conference call has been initiated.

A method for automated call launching from a web server is described including receiving a place call request from a user at the server, the place call request including a number of designated participants; initiating a distributed process among a plurality of multipoint conference units that locates an available multipoint conference unit having an available virtual conference room with a number of ports at least as great as the number of designated participants; receiving an availability response from the available multipoint conference unit; and initiating a call launch by the available multipoint conference unit, wherein the available multipoint conference unit calls each of the number of designated participants with an invitation to join a call.

In one aspect, initiating a distributed process includes transmitting the place call request to distributed middleware. In another aspect, the place call request includes a designation of a preferred multipoint conference unit, and the distributed process determines availability of the preferred multipoint conference unit prior to determining the availability of any other multipoint conference unit. The place call request may include a universal datagram protocol datagram transmitted over a data network. Initiating a call launch by the available multipoint conference unit may include remotely logging in to the available multipoint conference unit and operating the available multipoint conference unit as a slave. The available multipoint conference unit include a plurality of cascaded multipoint conference units. In one aspect, the method may further include generating the place call request from a web client.

A computer program product for automated call launching from a server is described, including code executing on a server, the code receiving a place call request from a user, the place call request including a number of designated participants; code executing on the server, the code initiating a distributed process among a plurality of multipoint conference units that locates an available multipoint conference unit having an available virtual conference room with a number of ports at least as great as the number of designated participants; code executing on the server, the code receiving an availability response from the available multipoint conference unit; and code executing on the server, the code initiating a call launch by the available multipoint conference unit, wherein the available multipoint conference unit calls each of the number of designated participants with an invitation to join a call.

The code initiating a distributed process may include computer executable code transmitting the place call request to distributed middleware. The place call request may include a designation of a preferred multipoint conference unit, and the distributed process may include computer executable code to determine availability of the preferred multipoint conference unit prior to determining the availability of any other multipoint conference unit. The place call request may include a universal datagram protocol datagram transmitted over a data network. The computer executable code initiating a call launch by the available multipoint conference unit may include computer executable code remotely logging in to the available multipoint conference unit and operating the available multipoint conference unit as a slave. The available multipoint conference unit may include a plurality of cascaded multipoint conference units.

There is described a distributed call management system including a plurality of multipoint conference units connected by a network, each one of the plurality of multipoint conference units having capability characteristics and availability characteristics; middleware executing on each of the multipoint conference units, the middleware on each one of the plurality of multipoint conference units exposing capability characteristics and availability characteristics to each other one of the plurality of multipoint conference units; and a user interface, the user interface receiving a call request from a user and submitting the call request to the middleware, the call request including a request for user-defined capability characteristics and user-defined availability characteristics, the middleware responding to the call request by locating an available multipoint conference unit having capabilities and availabilities consistent with the call request.

In one aspect, the call request designates one or more participants on a telecommunications network and one or more participants on a data network. The user interface may be a web client. At least one of the multipoint conference units may operate in a rack, the rack further including a gateway and a web server. The capability characteristics may include one or more voice codecs, one or more video codecs, and data sharing.

BRIEF DESCRIPTION OF DRAWINGS

The foregoing and other objects and advantages of the invention will be appreciated more fully from the following further description thereof, with reference to the accompanying drawings, wherein.

DETAILED DESCRIPTION OF CERTAIN ILLUSTRATED EMBODIMENT(S)

To provide an overall understanding of the invention, certain illustrative embodiments will now be described, including middleware for dynamic call management and a system for automated call launching in a video conferencing network. However, it will be understood by those of ordinary skill in the art that the methods and systems described herein can be suitably adapted to other systems that require the management of distributed resources on a network, such as, for example voice-over-Internet-Protocol conference calling.

Figure 1:
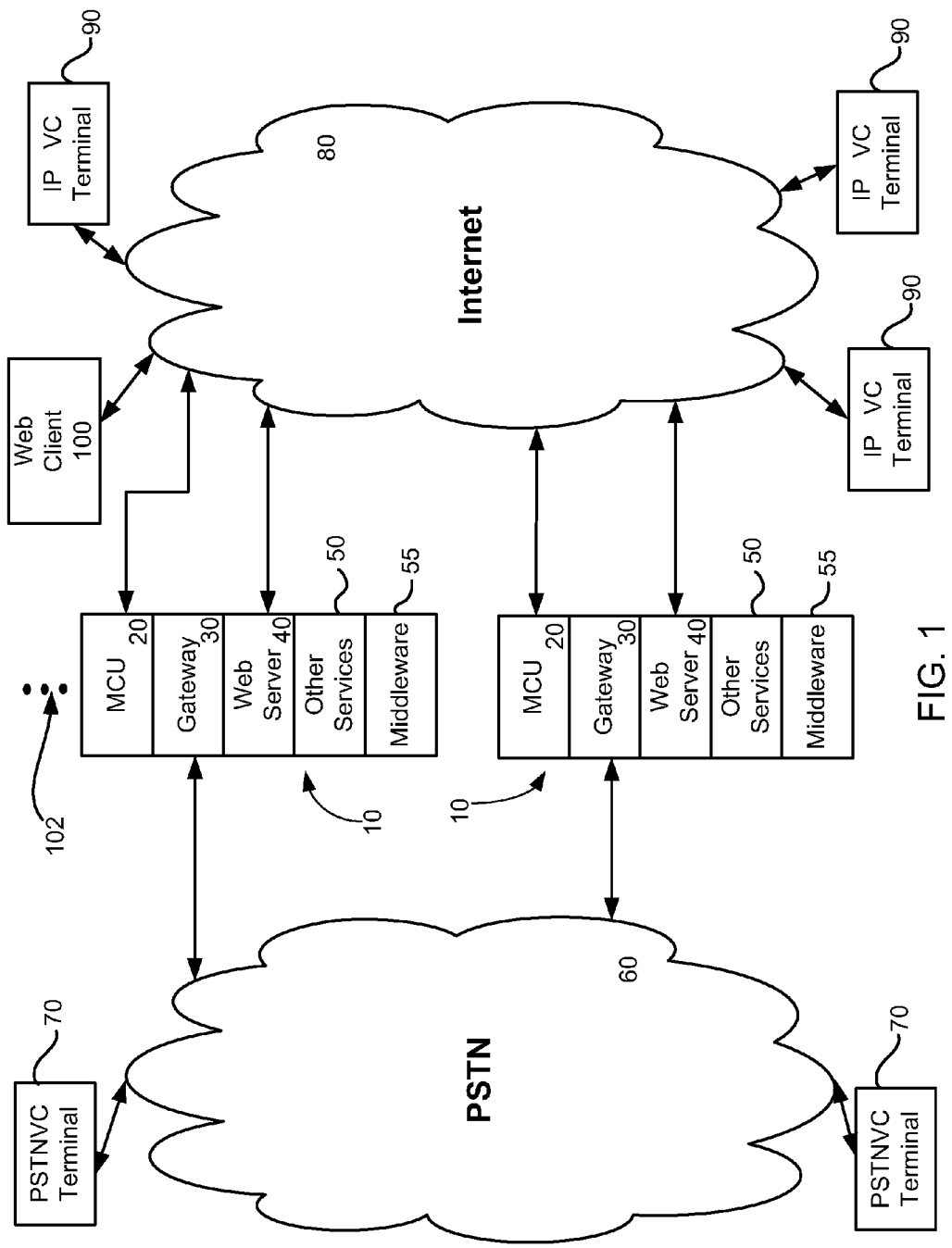
FIG. 1 shows a video conferencing system according to the principles of the invention.

FIG. 1 shows a video conferencing system according to the principles of the invention. A rack 10 includes a multipoint conference unit ("MCU") 20, a gateway 30, a web server 40, hardware/software for other services 50, and middleware 55. The gateway 30 provides one or more connections to the Public Switched Telephone Network 60, preferably through line cards for high speed connections such as Integrated Services Digital Network ("ISDN") lines, T1 lines, or Digital Subscriber Lines ("DSL"). A plurality of PSTN video conferencing ("VC") terminals 70 are also connected in a communicating relationship with the PSTN 60, and are accessible using known telecommunications dialing and signaling services. The MCU 20 and the web server 40 are connected in a communicating relationship with the Internet 80. A plurality of Internet Protocol ("IP") VC terminals 90 are also connected in a communicating relationship with the Internet 80, and are accessible by using known data networking techniques, such as IP addressing. A web client 100 is connecting in a communicating relationship with the Internet 80.

It will be appreciated that the components of the rack 10, such as the MCU 20, the gateway 30, the web server 40, the other services 50, and the middleware 55, may be realized as separate physical machines, as separate logical machines on a single computer, or as separate processes on a single logical machine, or some combination of these. Additionally, each component of the rack 10, such as the web server 40, may comprise a number of separate physical machines grouped as a single logical machine, as for example, where traffic on the web server 40 exceeds the data handling and processing power of a single machine. Furthermore, while in one embodiment the web server 40 is a conventional web server, the web server 40 may also be any other type of network server capable of communicating with the web client 100. A distributed video conferencing network may include a number of racks 10, as indicated by an ellipsis 102.

In one embodiment, each PSTN VC terminal 70 uses an established telecommunications video conferencing standard such as H.320. H.320 is the International Telecommunication Union telecommunications ("ITU-T") standard for sending voice and audio over the PSTN 60, and provides common formats for compatible audio/video inputs and outputs, and protocols that allow a multimedia terminal to utilize the communications links and synchronize audio and video signals. The T.120 standard may also be used to enable data sharing and collaboration. Each PSTN VC terminal 70 may include inputs such as a microphone, video camera, and keyboard, and may include outputs such as a display and a speaker. The H.320 and T.120 standards may be implemented entirely in software on a computer, or in dedicated hardware, or in some combination of these. The gateway 30 communicates with the PSTN 60, and translates data between a form compatible with the PSTN 60 and a form compatible with the Internet 80.

Each IP VC terminal 90 uses an established data networking video conferencing standard such as H.323. H.323 is the ITU-T standard for sending voice and audio over data networks using IP, and provides common formats for compatible audio/video inputs and outputs, and protocols that allow a multimedia terminal to utilize the communications links and synchronize audio and video signals. The T.120 standard may also be used to enable data sharing and collaboration. Each IP VC terminal 90 may include inputs such as a microphone, video camera, and keyboard, and may include outputs such as a display and a speaker. The H.323 and T.120 standards may be implemented entirely in software on a computer, or in dedicated hardware, or in some combination of these.

The MCU 20 communicates with the IP VC terminals 90 over the Internet 80. The MCU 20 includes hardware and/or software implementing the H.323 standard and the T.120 standard, and also includes multipoint control for switching and multiplexing video conferencing and data streams. The MCU 20 additionally includes hardware and/or software to receive from, and transmit to, PSTN VC terminals 70 connected to the gateway 30.

The middleware 55 is a distributed process operating on a number of racks 10. The middleware 55 operates generally to share information concerning addresses of terminals 70, 90, capabilities of MCU's 20, availability of MCU conference rooms, and the like. Each middleware process 55 communicates with other middleware processes 55 using a data network such as the Internet 80. In one embodiment, a middleware process 55 is associated with each rack 10 of the system, although other arrangements are possible, provided the distributed middleware 55 can communicate with each MCU 20 and at least one web server 40 in the system.

The web client 100 may be any device for accessing the Internet 80 using a Uniform Resource Locator ("URL"). The web client 100 may be a computer having a modem, cable modem, network interface card, DSL card or other interface to the Internet 80. The web client 100 may also be a mobile computer, a television set-top box, a personal digital assistant, a web phone, or any other wired or wireless Internet access device. The web client 100 accesses one of the web servers 40, which provides data and code to the web client 100 for local display and execution. It will be appreciated that, although drawn separately, the web client 100 may operate as a process on any of the IP VC terminals 90. A user of a PSTN VC terminal 70 will typically use a separate device as a web client 100, such as a personal 110 computer with dial-in access to the Internet 80. However, a web client 100 may also physically reside in the same unit as the PSTN VC terminal 70. Where the PSTN VC terminal 70 is implemented in software, the web client 100 may share a processor with the PSTN VC terminal 70. Use of the web client 100 for call launching will be described in further detail below.

The rack 10 provides additional services for use in a video conferencing network. These include, for example, audio/video coder/decoders ("codecs") that are not within the H.323 or H.320 standards, such as the G2 encoder and streamer for use with a proprietary streaming system sold by RealNetworks, Inc., and a Windows Media codec for use with a proprietary media system sold by Microsoft Corporation. Other services include a directory server, a conference scheduler, a database server, an authentication server, and a billing/metering system. It will be appreciated that a video conferencing network may include a plurality of racks 10, each including an MCU 20, a gateway 30, a web server 40, and other services 50.

Figure 2:
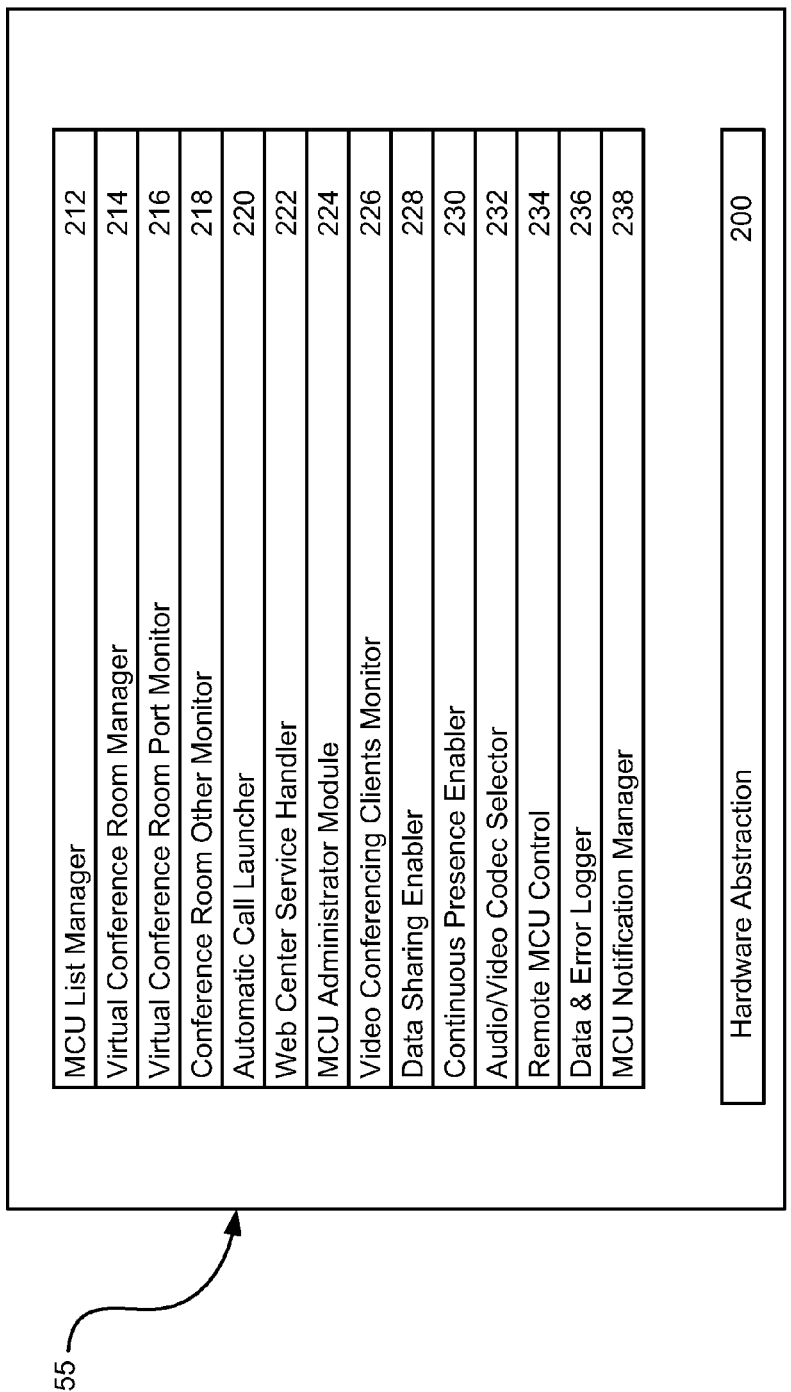
FIG. 2 shows the modules of one middleware layer suitable for use with the system depicted in FIG. 1.

FIG. 2 shows the modules of one middleware layer suitable for use with the system depicted in FIG. 1. Each module may be, for example, a software object or component having a pre-defined interface for use in an object oriented programming environment. A hardware abstraction layer 200, while not a part of the middleware layer, may generally be used to provide a hardware-independent foundation for software components, and typically includes an operating system such as Windows NT, UNIX, or a UNIX derivative.

In one embodiment, the middleware layer 55 includes C++ class libraries for encapsulating network properties such as MCU capabilities, terminal capabilities, and participant characteristics in a distributed network environment. The classes define components and hierarchies for conference rooms and participants, and provide functionality for call management, sharing capability information, call initiation, MCU management, and the like. In particular, the middleware layer 55 permits call management such that the web client 100 can initiate conference calls using one or more remote MCU's 20, without administration level access to any one of the MCU's 20. As noted above, the middleware 55 is distributed middleware, with components residing on each rack 10 in the video conferencing network. It will be appreciated that, although not shown in FIG. 2, the middleware 55 includes interfaces to the MCU 20, the gateway 30, the web server 40, other services 50, and the Internet 80.

An MCU list manager 212 includes a data structure including a list of known MCU's 20. This list may be exported to, or imported from, other middleware layers 55, or may be shared among the middleware layers 55. The MCU list manager 212 includes a routine for checking the status of MCU's on the list to determine whether they are currently operating and responding. The MCU list manager 212 also includes a routine for adding and deleting MCU's from the list.

A virtual conference room manager 214 maintains information on each virtual conference room in the video conferencing network. Conference room properties maintained by the virtual conference room manager 214 include a room name, connection allocations, client types and a data sharing enablement switch. Security features may also be described, such as public (open to all), reserved (open to specific participants), public with lock (open to all, but may be secured by participants), and reserved with security (password entry only). Bandwidth minima and maxima may be established, as well as any timers, such as video switching dwell which determines how long video from a certain camera is provided to conference participants. Other conference room properties such as video mode, frame rate, and audio mode may also be defined.

In one embodiment, the video mode is one of H.261 FCIF, H.263 QCIF, H.263 FCIF, H.261 QCIF, and H.263 SQCIF. These are well known teleconferencing video standards which define different image size and quality parameters. In one embodiment, the audio mode is one of G.711, G.722, or G.723.1. These are well known teleconferencing audio standards which define different levels of quality for audio data transmission. These audio/video standards are commonly referred to as "codecs," or coder/decoders operating according to predetermined protocols. The above information is preferably included in shared data structures maintained by the network conferencing middleware 55.

A virtual conference room port monitor 216 provides information relating to specific ports of a virtual conference room. This includes conference room information and a terminal identifier associated with a particular port. The ports correspond to logical ports of one of the MCU's 20. This information is preferably included in shared data structures maintained by the network conferencing middleware 55.

A conference room other monitor 218 maintains information and functions for controlling other miscellaneous conference room parameters. For example, a terminal light may be displayed to show that a conference room is active. "Other" information is preferably included in shared data structures maintained by the network conferencing middleware 55.

An automatic call launcher 220 provides a functional interface to the web client 100 by which a user may create and launch a video conference. The automatic call launcher 220 receives command datagrams, preferably Universal Datagram Protocol ("UDP") datagrams, from the web client 100. These incoming datagrams are parsed into commands and data structures suitable to the middleware 55, e.g., using the syntax of the C++ programming language. When the command in a datagram includes a call launch request, each designated video terminal is contacted through the MCU notification manager 238 described below. The parsed datagram should provide, for example, designated video terminals, selected codecs, a conference name, etc., which are transmitted, as appropriate to the video terminals along with a conference alert. Responses from the designated video terminals are collected and returned to the web client 100 in a second datagram. Operation of the automatic call launcher is described in more detail below with reference to the call launching procedure flow chart. The automatic call launcher 220 preferably uses the shared data structures maintained by the network conferencing middleware 55.

A web center service handler 222 handles information requests from the web server 40 on the rack 10, so that a web client 100 may view current call schedules and activity on a web site. In particular, the web center service handler 222 converts web client 100 requests from, for example, a Universal Datagram Protocol ("UDP") format into, for example, a Distributed Component Object Model ("DCOM") call that can be recognized by the middleware layer 55. This permits remote login from web clients 100 for system administration, scheduling, and directory services.

An MCU administrator module 224 provides administration level system access to the MCU's 20. For example, through the MCU administrator module 224, an authorized user can shut down one of the MCU's 20, terminate any conference rooms or any ports, and change current properties for one of the MCU's 20.

A video conferencing clients monitor 226 maintains information on a client-by-client basis. This includes a name of the client, a conference name for a conference that the client is attending, the type of conference, and a meeting name. The video conference clients monitor 226 also includes a terminal identification for the client, and any viewing mode information associated with the client. The above information is preferably included in shared data structures maintained by the network conferencing middleware 210.

A data sharing enabler 228 is provided to support data sharing services, such as T.120 data sharing. A continuous presence enabler 230 is included to enable continuous presence. An audio/video codec selector 232 maintains available codecs and provides codecs as requested for various conferences and users. The audio/video codec selector 232 also maintains a list of presently available codecs. A remote MCU control 234 enables administration-type control of an MCU 20 from a remote location on a data network, including login and authentication. A data and error logger 236 provides logging of conference and user data, as well as errors.

An MCU notification manager 238 provides an interface between MCU's 20 and the middleware layer 55. In particular, the MCU notification manager 238 prepares notifications to MCU's 20 and receives replies from the MCU's 20, and converts these communications between a middleware-compatible form (such as DCOM) and an MCU-compatible form. Return messages from the MCU's 20 may relate to, for example, capabilities of an MCU or availability of a virtual conference room. Additionally, since the MCU 20 calls out to participants, the MCU notification manager 238 can receive return messages relating to the status of participant calls, e.g., a participant has declined a call, a participant has accepted a call, a participant is unavailable, etc.

Figure 3:
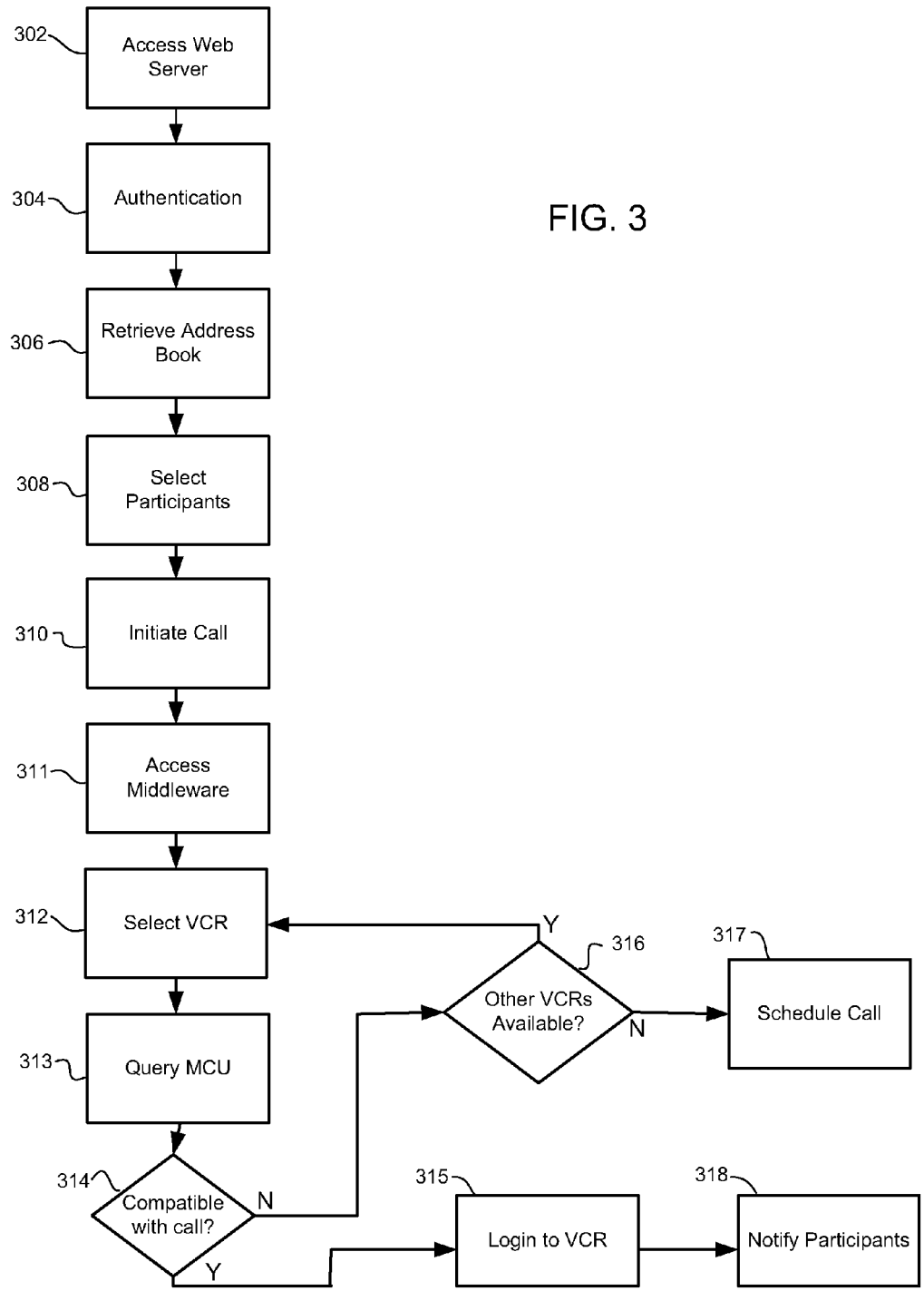
FIG. 3 is a flow chart of an automatic call launch according to the principles of the invention.

FIG. 3 is a flow chart of an automatic call launch according to the principles of the invention.

A call launch begins when a user accesses a web server 40 from the web client 100, as shown in step 302. It will be appreciated that the web server 40 may provide graphics, functional devices such as radio buttons and text entry boxes, and code to the web client 100, along with any other media or data known in the art. The functionality of the web server 40 may be realized with Java components and scripts such as Active Server Pages, Hyper Text Markup Language 4.0, Visual Basic Script, and Java Script. Client-side Java applets, or the like, may also be provided to the web client 100.

As shown in step 304, authentication is performed for the user by checking a user name and a password against an authentication database. Authentication services may be provided, for example, by the Windows NT operating system.

Once a user has been authenticated, a video conferencing directory, or "address book" corresponding to the authenticated user may be retrieved from a user database, as shown in step 306. The address book may include a private address book for the user, a corporate address book for an entity associated with the user, or a public address book provided, for example, by the user's Internet service provider. The address book contains entries for video conferencing terminals and includes, for each terminal, an e-mail address, an IP address (or alias), and an ISDN phone number. The e-mail address is used to notify participants of calls to which they have been invited. The IP address (or alias) or the ISDN phone number is used for conference call communications. Once the address book has been retrieved, it may be displayed to the user at the web client 100. Address book entries may be stored in a database accessible using a query language such as SQL.

Using the graphical user interface available at the web client 100, the user may select participants from one or more address books as shown in step 308. Typically, this is performed by selecting checkboxes next to individual terminals. The graphical user interface may also include a search engine for searching large address books according to user-defined criteria.

As shown in step 310, the user initiates a call from the web client 100, preferably by selecting a button labeled "place call now", or the like. In response to activation of the "place call now" button, the web client 100 formulates a place call request to the web server 40 to launch a call, using, for example, a UDP datagram.

As shown in step 311, the web server 40 accesses the distributed middleware 55. The web server 40 receives the place call request and formulates a query to the distributed middleware 55 for an available conference room. The query includes a source address, a command, an MCU identifier, a login name, and a password, as well as information that identifies participants. This query is communicated to the distributed middleware 55, preferably using a UDP datagram, which may be converted to a Distributed Component Object Model ("DCOM") call by the web center service handler 222 of the middleware 55. The distributed component object model is an extension of the Component Object Model ("COM") developed by Microsoft Corporation to support objects across a network. Other protocols, such as Common Object Request Broker Architecture ("CORBA"), may be used, although DCOM is preferably used in a Windows NT environment.

The distributed middleware 55 uses the information in the place call request to locate a suitable MCU 20 for the requested call. In particular, the distributed middleware 55 prioritizes the MCU's known to the MCU list manager 212 according to distance from the user. This may be determined using, for example, the IP address of the user in the place call request and the IP addresses of the MCU's known to the MCU list manager 212 (i.e., stored in the MCU list manager 212 data structures).

As shown in step 312, a virtual conference room is selected. The virtual conference rooms on an MCU may be identified using the virtual conference room manager 214 of the middleware 55. It will be appreciated that, although an MCU list object is maintained, and although the distributed middleware 55 includes routines for periodic updates to MCU lists, MCU resources may be dynamically allocated without notification to the distributed middleware 55. Thus availability is checked prior to launching a call, including the number of ports available for a conference room. A call schedule may also be examined to determine whether a virtual conference room is committed to a call within a certain amount of time, so that it should not be made available to the current call request.

As shown in step 313, the suitable MCU 20 is queried by the middleware 55. This may be performed through DCOM calls to the MCU 20. In particular, the middleware 55, through the MCU notification manager 238, formulates a series of commands to the MCU 20 requesting information on the virtual conference room identified in step 312. Each command is parsed by the MCU 20. The command may be transmitted to the MCU as numerical command that is mapped to an MCU-recognizable command syntax using a command look-up table.

For example, a first command identifies a particular virtual conference room, and requests the type of the room. This may be either "public" (not protected) or "reserved" (protected). The virtual conference room type is returned to the middleware 55 by the MCU, and it is compared to the room type for the requested call launch. If the type matches, then the middleware 55 formulates a request concerning whether the conference room is active. This is accomplished by requesting the bit rate for the virtual conference room, with a bit rate of zero indicating that the virtual conference room is inactive, i.e., available. If the virtual conference room is inactive, then the middleware 55 requests the number of ports available in the virtual conference room (which may be allocated by the MCU). This is compared to the number of participants specified in the place call request to ensure that the virtual conference room has sufficient ports to support the participants. Similarly, the capabilities of each participant video conferencing terminal, such as audio and video codecs, are compared to the capabilities or the virtual conference room. Alternatively, the virtual conference room may be set to recognize any standard client known to the MCU. If each of the above queries results in a favorable response from the MCU, then the middleware 55 proceeds to step 315. Otherwise the middleware 55 proceeds to step 316.

As shown in step 316, if any of the above queries result in a response indicating that the virtual conference room cannot support the requested call, then the middleware 55 identifies the next virtual conference room on the current MCU. When the virtual conference rooms on an MCU have been exhausted, the middleware 55 proceeds to examine virtual conference rooms in the next MCU identified in the prioritized list described in step 311.

It will be appreciated that, at certain times, there will be no virtual conference rooms's available to satisfy a particular call request. If no virtual conference room is located in steps 312-316, then the call may be scheduled at some other time, as shown in step 317. In particular, a message is transmitted from the middleware 55 to the web client 100. The user is provided with an option of scheduling the call for a later time. If this option is selected, then the scheduled call is launched automatically at the scheduled time using the same procedure outlined below.

When a suitable virtual conference room is located in step 314, the middleware 55 logs in to the MCU that includes the virtual conference room using the MCU administrator module 224. The middleware 55 transmits conference information received from the call requester. The MCU that provides the suitable virtual conference room then becomes a slave of the middleware 55, so that call setup may be remotely managed.

The slave MCU having the suitable virtual conference room contacts designated participants, as shown in step 318. For H.323 terminals (data network), the notification may be an e-mail, or a pop-up window launched through a web browser. For H.320 terminals (telecommunications network), the notification is performed by dialing out to the participant through a gateway. The user may also join the conference, preferably by selecting an "add me" button on the web client 100 display. Replies from designated participants, or an absence thereof, are communicated to the middleware layer 55, and then to the web client 100 where call progress may be displayed. In one embodiment, multiple MCU's may be cascaded to provide a virtual conference room with more ports than are physically available on a single MCU.

Figure 4:
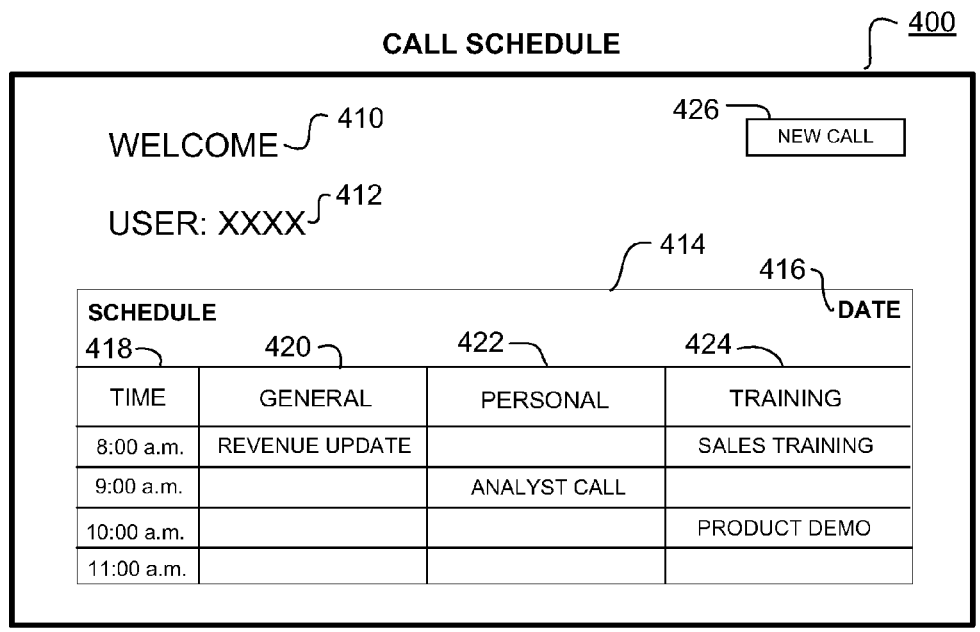
FIG. 4 shows a display of a call scheduling web page according to the principles of the invention.

FIG. 4 shows a display of a call scheduling web page according to the principles of the invention. The various features of the web pages described below may include any known media, including animation, sound, music, graphics, and text. It will be appreciated that such web pages may be generated and interpreted using many known programming languages or mark-up languages, and any associated plug-ins or add-ons, including HTML, SHTML, XML, DHTML, JavaScript, Java, Perl, PHP3, CGI, C, and C++, all of which may be used to practice the invention. A user may view the web page 400, and the following pages, by entering, or selecting a link to, a Universal Resource Locator ("URL") with a browser such as Microsoft Explorer or Netscape Navigator, executing on the web client 100. This URL, or "address" will direct the web client 100 to request attention from the web server 40, which responds by providing to the browser any mix of the media and code described above.

The web page 400 includes a title bar 410, a user name 412, and a call schedule area 414. Information for scheduled calls is displayed in the call schedule area 414, which includes a date 416 for the displayed schedule. The schedule is preferably arranged into columns including a column for time 418, and columns for call subject matter, such as general 420, personal 422, and training 424. The web page 400 includes a "new call" button 426 through which a user may access a call launching page.

Figure 5:
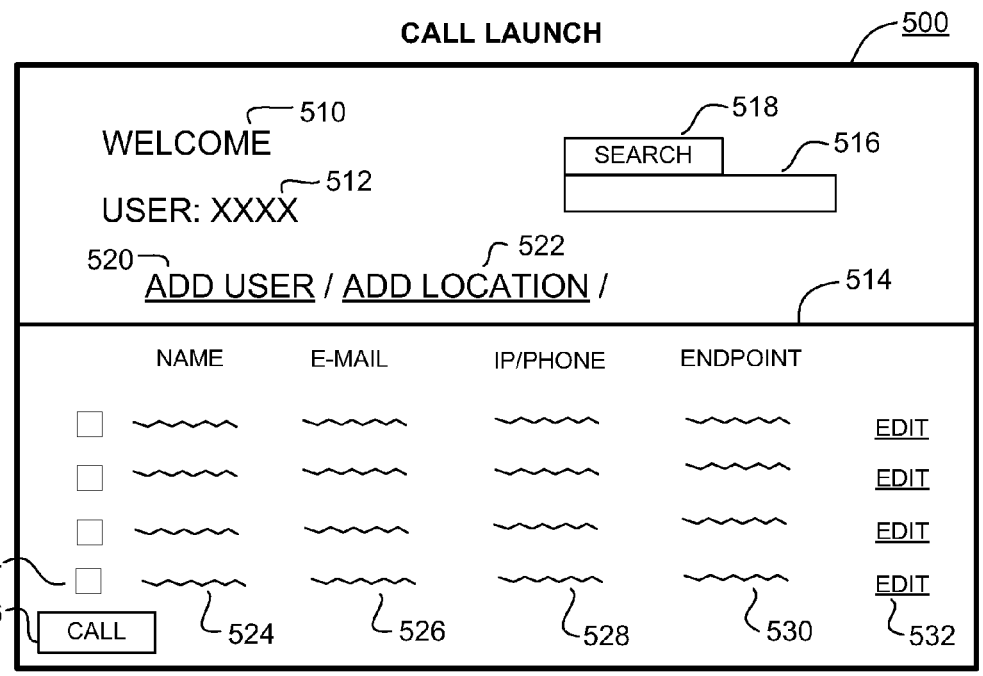
FIG. 5 shows a display of a call launching web page according to the principles of the invention.

FIG. 5 shows a display of a call launching web page according to the principles of the invention. The call launching page 500 includes a greeting 510, a user 512, and an address book 514. A text box 516 is provided, into which a user may enter text (including wild cards) for searching an address book 514 for specific names or addresses. A search is conducted, based upon the text in the text box 516, by activating a search button 518. A user may also add a user or add a location by activating hyperlinks 520, 522 in the call launching page 500. The address book 514 may include, for example, a number of entries, each entry having a name 524, an e-mail address 526, an IP address or ISDN phone number 528, and an alias or "endpoint" 530. An edit link 532 is provided for each entry so that it may be modified. In one embodiment, only the name 524 is displayed in the address book. Other arrangements are also possible, such as displaying the name 524 and the e-mail address 526, such that a user may contact a participant by e-mail prior to inviting the participant into a conference call. A check box 534 is provided for each entry so that a user may manually select each participant for a call. Once one or more participants have been selected using the check boxes 534, the user may launch the call by selecting the call button 536.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method for automated call launching from a first Multipoint Conference Unit (MCU) having a first middleware program, among networked MCUs, each MCU having a middleware program, the method comprising:

the first middleware program receiving a place call request from a user, the place call request including a number of designated participants;

the first middleware program contacting middleware programs on networked MCUs and locating an available MCU having an available virtual conference room with a number of ports at least as great as the number of designated participants;

the first middleware program receiving an availability response from the available MCU;

initiating a call launch by the available MCU, wherein the available MCU calls each of the number of designated participants with an invitation to join a call; and wherein initiating a call launch comprises remotely logging into the available MCU and operating the available MCU as a slave.

2. The method of claim 1 wherein the place call request includes a designation of a preferred MCU, and wherein the first middleware program determines availability of the preferred MCU prior to determining the availability of any other MCU.

3. The method of claim 1 wherein the place call request comprises a universal datagram protocol datagram transmitted over a data network.

4. The method of claim 1 wherein the available MCU comprises a plurality of cascaded MCUs.

5. The method of claim 1 further comprising generating the place call request from a web client.

6. A computer program product stored on computer readable media for automated conference call launching from a Multipoint Conference Unit (MCU) among networked MCUs, wherein the computer program product is running on each of the MCUs, the computer program product comprising:

code executing on the MCU; the code receiving a place call request from a user, the place call request including a number of designated participants;

code executing on the MCU, the code contacting computer program products on MCUs and locating among a plurality of MCUs an available MCU having an available virtual conference room with a number of ports at least as great as the number of designated participants;

code executing on the MCU, the code receiving an availability response from the available MCU; and code executing on the MCU, the code initiating a call launch by the available MCU, wherein the available MCU calls each of the number of designated participants with an invitation to join a call, wherein the code initiating a call launch comprises computer executable code remotely logging into the available MCU and operating the available MCU as a slave.

7. The computer executable code of claim 6 wherein the place call request includes a designation of a preferred MCU, and wherein the computer executable code to determine availability of the preferred MCU prior to determining the availability of any other MCU.

8. The computer executable code of claim 6 wherein the place call request comprises a universal datagram protocol datagram transmitted over a data network.

9. The computer executable code of claim 6 wherein the available MCU comprises a plurality of cascaded MCUs.

10. A distributed call management system comprising:

a plurality of Multipoint Conference Units (MCUs) connected by a network, each one of the plurality of MCUs having capability characteristics and availability characteristics;

wherein each MCU having a middleware program executing on each of the MCUs exposing capability characteristics and availability characteristics to each other one of the plurality of MCUs;

wherein the MCU having a user interface, receiving a call request from a user and submitting the call request to the middleware program, the call request including a request for user-defined capability characteristics and user-defined availability characteristics, the middleware program responding to the call request by locating an available MCU having capabilities and availabilities consistent with the call request;

wherein the available MCU initiates a call launch for remotely logging into the available MCU and operating the available MCU and operating the available MCU as a slave.

11. The distributed call management system of claim 10 wherein the call request designates one or more participants on a telecommunications network and one or more participants on a data network.

12. The distributed call management system of claim 10, the user interface further comprising a web client.

13. The distributed call management system of claim 10, further comprising a rack, wherein at least one of the MCUs operates in the rack, the rack further including a gateway and a web server.

14. The distributed call management system of claim 10, the capability characteristics including one or more voice codecs, one or more video codecs, and data sharing.

* * * * *